United States Patent [19]
Klimczak

[11] 4,324,569
[45] Apr. 13, 1982

[54] AIRCRAFT FUEL BOOSTER PUMP ASSEMBLY WITH ALTITUDE START CAPABILITIES

[75] Inventor: Anthony J. Klimczak, Parma, Ohio

[73] Assignee: Lear Siegler, Inc., Elyria, Ohio

[21] Appl. No.: 780,229

[22] Filed: Mar. 22, 1977

[51] Int. Cl.[3] .............................................. B01D 19/00
[52] U.S. Cl. ......................................... 55/182; 55/199
[58] Field of Search ................. 55/182, 184, 185, 199, 55/201

[56] References Cited

U.S. PATENT DOCUMENTS

| | | | |
|---|---|---|---|
| 1,345,895 | 7/1920 | Seguin | 55/201 |
| 2,463,251 | 3/1949 | Curtis | 55/199 X |
| 2,761,393 | 9/1956 | Stefano et al. | 55/201 |
| 2,815,717 | 12/1957 | Szwargulski et al. | 55/201 |
| 2,845,870 | 8/1958 | Lock | 55/199 |
| 2,985,108 | 5/1961 | Stoner et al. | 55/199 |
| 3,090,321 | 5/1963 | Edwards | 55/199 |

FOREIGN PATENT DOCUMENTS

| | | | |
|---|---|---|---|
| 466028 | 6/1975 | U.S.S.R. | 55/182 |

*Primary Examiner*—Robert H. Spitzer
*Attorney, Agent, or Firm*—Maky, Renner, Otto & Boisselle

[57] ABSTRACT

The pump assembly includes a rotatably mounted impeller with vented shroud surrounding same for venting air and vapors from the liquid being pumped to avoid possible vapor lock so that the pump will start and prime itself over a wide range of altitudes and temperatures. The impeller is preferably of the mixed flow type which, together with the inlet venting, assures that the pump will adequately separate the air and vapors from the liquid being pumped and deliver substantially vapor-free liquid at the desired pressure.

11 Claims, 4 Drawing Figures

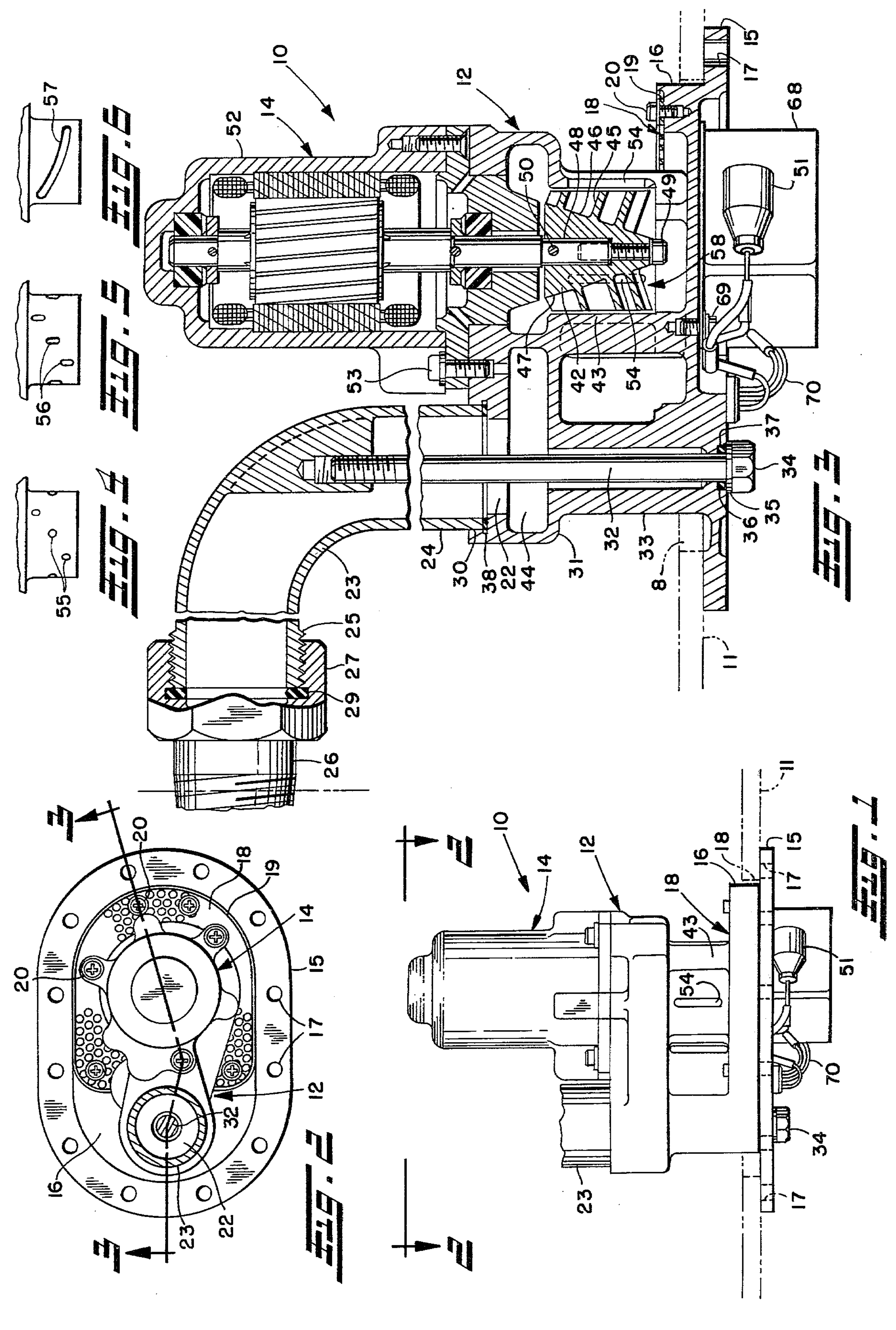

AIRCRAFT FUEL BOOSTER PUMP ASSEMBLY WITH ALTITUDE START CAPABILITIES

BACKGROUND OF THE INVENTION

This invention relates generally as indicated to an aircraft fuel booster pump assembly with altitude start capabilities, and more particularly to a fuel tank booster or standby pump which can readily be started over a wide range of altitudes and temperatures to establish and maintain rated flow at specified outlet pressure.

Jet fuel is usually supplied to the engines of the aircraft by an engine driven pump. However, because the fuel tanks are usually low relative to the engine, a tank pump is also normally required to pump the fuel to the engine under pressure to prevent cavitation in the engine driven pump and to minimize wear and improve the efficiency thereof.

In such aircraft fuel systems, for flight safety reasons, redundant or standby pumps are also required so that in the event of a failure of the main fuel tank pump, or a drop-off in pressure, the booster pump can still provide sufficient fuel line pressure to effect movement of the fuel from tank-to-tank and from tank to the engine.

Ideally such booster pumps should preferably be off except when needed to maintain the desired fuel line pressure. However, in actual practice it has been found that if the usual aircraft fuel booster pumps are required to be started at high altitudes, they may fail to prime themselves and not effect the required movement of the fuel. To avoid this problem, the normal practice has been to start the booster pumps during ground operations and keep the pumps operating during the entire flight or until the fuel is exhausted from the particular tanks in which the booster pumps are located. Since the actual fuel flow requirements of systems with redundant or standby pumps are only a fraction of the total system capability when all systems are working, operating redundant fuel pumps during the entire flight results in wasted consumption of electrical power, and in many cases taxes the aircraft electrical generating systems to their limits. The entire operation also results in a reduction of fuel available for the engines and a reduction in flight range for the aircraft.

SUMMARY OF THE INVENTION

With the foregoing in mind, it is a principal object of this invention to provide a pump assembly having the capability of priming itself when started at high altitudes to establish and maintain rated flow at the specified outlet pressure.

Another object is to provide such a pump assembly in which the formation of air and vapor bubbles at the pump inlet is prevented.

Still another object is to provide such a pump assembly which delivers substantially vapor-free liquid under pressure.

These and other objects of the present invention may be achieved by providing a pump assembly with a vented shroud surrounding the rotatably mounted impeller for separating air and fuel vapors from the liquid fuel and venting such air and fuel vapors from the pump so that the pump will start and prime itself at high altitudes. The shroud is vented by providing openings therein which may be of various configurations, although circumferentially spaced axial slots in the shroud are preferred. The impeller is preferably a mixed flow impeller which, in conjunction with the pump inlet venting, assures that the pump will satisfactorily separate the air and vapors from the liquid and deliver a single phase liquid discharge from the pump.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In the annexed drawings:

FIG. 1 is a side elevation view of a preferred form of centrifugal pump assembly in accordance with this invention shown mounted on the bottom wall of a fuel tank or the like;

FIG. 2 is a top plan view of the pump of FIG. 1, as seen from the plane of the line 2—2 thereof;

FIG. 3 is an enlarged section view through the pump of FIG. 2, taken along the line 3—3 thereof; and FIGS. 4 through 6 are fragmentary side elevation views showing various alternate ways of venting the pump.

DESCRIPTION OF THE PREFERRED EMBODIMENT

Referring now in detail to the drawings and initially to FIGS. 1 and 2 thereof, there is shown a preferred form of pump assembly 10 constructed in accordance with this invention secured to the bottom of an aircraft fuel tank 11 or the like. The pump assembly 10 includes a pump 12 and drive assembly 14, the former having a mounting flange 15 at its base 16 including bolt holes 17 for bolting the pump assembly to the tank. The pump assembly 10 may be inserted through an opening 8 in the bottom wall of the tank and bolted or otherwise secured in place with the pump assembly completely submerged in the fluid contained in the tank. A suitable gasket (not shown) may be provided between the flange and tank to prevent leakage of fluid therefrom.

As clearly shown in FIGS. 2 and 3, the pump 12 has a relatively large annular area inlet 18 in the base 16 of the pump which opens upwardly to provide fluid to the pump from the tank. A screen 19 may be fastened to the base 16 of the pump over the inlet by screws 20 or the like to prevent debris or other solid contaminants from being drawn into the pump. At the other end of the pump is an outlet 22 for connection to the fuel system components downstream of the pump in conventional manner, for example, by providing a discharge fitting 23, which may be elbow-shaped with one end 24 suitably connected to the outlet 22 and the other end 25 connected to a pipe 26 passing through the wall of the tank by a coupling 27 engaging a threaded portion on such other end. A gasket 29 or the like may be provided between the fitting and coupling to prevent leakage.

The end 24 of the discharge fitting 23 may be received in an upwardly opening recessed area 30 in the pump housing 31 adjacent the outlet 22, and secured in place as by means of a bolt 32 which extends through a support leg 33 and the outlet 22 of the housing and threadedly engages a threaded aperture in the inner wall of the fitting. The bolt head 34 is at the exterior of the pump to facilitate tightening, and may be provided with a washer 35 and an O-ring seal 36 in a recessed area 37 in the base 16 to prevent leakage. A gasket 38 or the like may be provided between the discharge fitting and the recess 30 in the pump housing in which the discharge fitting is received.

Referring more particularly to FIG. 3, the pump 12 comprises an impeller 42 rotatably mounted within and surrounded by a shroud 43 having a cylindrical inner wall closely surrounding the impeller blades. The impeller 42 functions in the shroud and discharges fluid received from the inlet 18 into a schroll type volute discharge chamber 44 which in turn communicates with the pump outlet 22. The pump housing 31 may be cast to include the discharge chamber 44 and shroud 43 therein, followed by machining of the shroud to provide a close tolerance relative to the impeller blades 45.

The impeller 42 is preferably of the mixed flow or variable lead type and comprises a tapered hub 46 with such impeller blades 45 extending at an angle along the tapered hub surface 47. Preferably, the spacing between adjacent portions of the impeller blade or blades 45 increases away from the pump inlet. The hub 46 is secured to the shaft 48 of the drive assembly 14 as by means of a bolt and washer assembly 49 extending axially through the hub and threadedly engaging a tapped opening in the distal end of the shaft, and the hub is also prevented from rotating relative to the shaft as by means of a pin 50 extending therebetween.

The drive assembly 14 may be a DC motor, but an AC motor is preferred if there is other AC equipment on the aircraft requiring an AC power source, because of the greater reliability and extended life of an AC motor over a DC motor. Single phase power is applied to the terminals of a start-run capacitor 51 attached to the exterior surface of the pump mounting flange 15.

As shown, the drive assembly 14 includes a motor housing 52 secured to the top of the pump housing 31 by mounting bolts 53 or the like. Such a construction permits the pump housing 31 to be cast and the shroud for the impeller to be subsequently machined to provide for relatively close tolerances between the impeller blades and shroud as previously described.

The drive motor is housed within the housing 52. A portion of the liquid fuel may be directed through the motor to lubricate bearings and provide for cooling and the like in conventional manner.

Heretofore, it has been found that when the drive assembly 14 is energized at altitude to start a centrifugal pump of the type thus far described, the pressure drop caused by the acceleration of the impeller during start up produces areas of localized relatively low pressure at the pump inlet or suction side of the impeller. It is believed that this low pressure at the inlet, particularly at relatively high altitudes and fuel temperatures, causes the air and fuel vapors to expand greatly and form a bubble at the inlet to the impeller under sufficient pressure to prevent liquid from entering the impeller vane passages, thus causing the pump to become vapor locked, seriously affecting the performance of the pump. Indeed, it has been found that the pump may not prime itself, or at the very least it will lengthen considerably the time it takes the pump to reach a steady flow rate.

It has been found, however, that when the shroud is vented as described hereafter, the vapor and air will be forced out through the vents by the liquid and centrifugal force, whereby the pump will start and prime itself and deliver single phase liquid to the outlet at a steady flow rate in a relatively short period of time over a wide range of altitudes and temperatures.

In the preferred form of pump shown in FIGS. 1 through 3 of the drawing, the shroud 43 is provided with a plurality of circumferentially spaced axial slits 54 extending radially outwardly from and axially over substantially the entire length of the impeller 42, there preferably being three such slits each spaced 120° apart and starting at a level approximately opposite the pump inlet 58 and extending approximately level with the discharge height of the impeller.

In actual tests, it has been found that with three such elongated slits, each approximately 0.095 inch wide and 0.9 inch long, the pump effectively and repeatedly primed itself, and established and maintained a rated flow of 3,000 PPH at an outlet pressure of 9 PSIG minimum under altitude test chamber conditions simulating a climb to an altitude of 45,000 feet using both JP-4 and Jet A fuel. Jet A fuel has a characteristic of maintaining more air in solution for longer time periods and at lower ambient pressures than JP-4 fuel.

Because of the relatively small size of the vent slits 54 in the shroud 43, such vent slits cannot be made in the usual casting process of the pump housing 31, and are preferably formed by a vertical milling operation.

Adequate inlet venting for accomplishing the desired altitude priming requirements may also be achieved by using circular holes 55 arranged in a staggered staircase pattern as shown in FIG. 4 (eight such holes being preferred); by providing elongated holes 56 in a similar staggered staircase pattern as shown in FIG. 5; or by providing a single curvilinear slit 57 in the impeller shroud as shown in FIG. 6. In each case, such openings desirably start at a level opposite the inlet and extend to the level of the discharge height of the impeller, similar to the slits 54 previously described.

In actual tests, it has been found that the best performance was achieved with a single curvilinear slit 57, but such a curvilinear slit is much more difficult to fabricate than the axial slits shown in FIG. 3.

The vent openings in the shroud must be sized to meet established requirements, with consideration being given to such factors as pump rating, altitude, fuel types, minimum time to effect rated flow and minimum discharge pressure. Oversizing of the vent openings results in a reduction of overall pump efficiency, while undersizing of the vent openings may result in failure of the pump to rid itself of air and vapor and become locked.

Inlet venting is also beneficial in fuel boost pump applications where the specification requires the unit to operate from sea level to the maximum aircraft altitude and the pump must be capable of handling volatile fuels such as aviation gasoline of Reid Vapor Pressure of 6 to 7 PSIA and turbine type fuels having Reid Vapor Pressure of 2 to 3 PSIA. The initial fuel temperature at the start of the climb may exceed 100° F. and fuel boiling may occur at approximately 15,000 feet for aviation gasoline and approximately 33,000 feet for turbine type fuels of vapor pressures noted above. Before boiling occurs, however, entrained air is evolved at altitudes slightly lower than boiling altitude. Air and fuel vapors must be separated so that only liquid fuel is delivered to the engine.

The mixed flow impeller in conjunction with the inlet venting of the present invention satisfactorily separates the air/vapors from the liquid and assures that the engine is provided substantially vapor-free fuel at the specified pressure level.

The embodiments of the invention in which an exclusive property or privilege is claimed are defined as follows:

1. A centrifugal aircraft fuel booster pump with altitude start capabilities comprising a housing containing an inlet and an outlet for the fuel to be pumped, a pump impeller rotatably mounted in said housing for pressurizing the fuel received from said inlet and delivering such pressurized fuel to said outlet, said housing including a shroud surrounding said impeller, and vent means extending radially outwardly from said impeller through said shroud for venting vapor and air bubbles in the fuel away from said impeller to facilitate priming of said pump during starting at high altitudes.

2. A pump as set forth in claim 1 wherein said impeller is a mixed flow impeller and comprises a helical blade on a tapered hub with the spacing between adjacent portions of said blade increasing away from said inlet.

3. A pump as set forth in claim 1 wherein said impeller is a mixed flow impeller and comprises a helical blade on a tapered hub, and said shroud closely surrounds said helical blade.

4. A pump as set forth in claim 3 wherein said shroud has a cylindrical inner wall closely surrounding said helical blade.

5. A pump as set forth in claim 1 wherein said vent means comprises at least one axial slit in said shroud.

6. A pump as set forth in claim 1 wherein said vent means comprises a plurality of circumferentially spaced axial slits in said shroud.

7. A pump as set forth in claim 6 wherein each said slit starts at a level approximately opposite said inlet and extends approximately to the level of the discharge height of said impeller.

8. A pump as set forth in claim 6 wherein there are three of said slits each spaced approximately 120° apart and each approximately 0.095 inch wide and 0.9 inch long.

9. A pump as set forth in claim 1 wherein said vent means comprises a curvilinear slit in said shroud, said slit starting at a level approximately opposite the inlet and extending approximately to the level of the discharge height of said impeller.

10. A pump as set forth in claim 1 wherein said vent means comprises a plurality of holes arranged in staggered staircase pattern in said shroud around the periphery thereof from adjacent said inlet approximately to the level of the discharge height of said impeller.

11. A pump as set forth in claim 10 wheein said holes are axially elongated.

* * * * *